July 18, 1967 H. J. CHALL ETAL 3,331,554
CALCULATING MACHINE
Original Filed Nov. 17, 1961 6 Sheets-Sheet 1

FIG_1

FIG_2

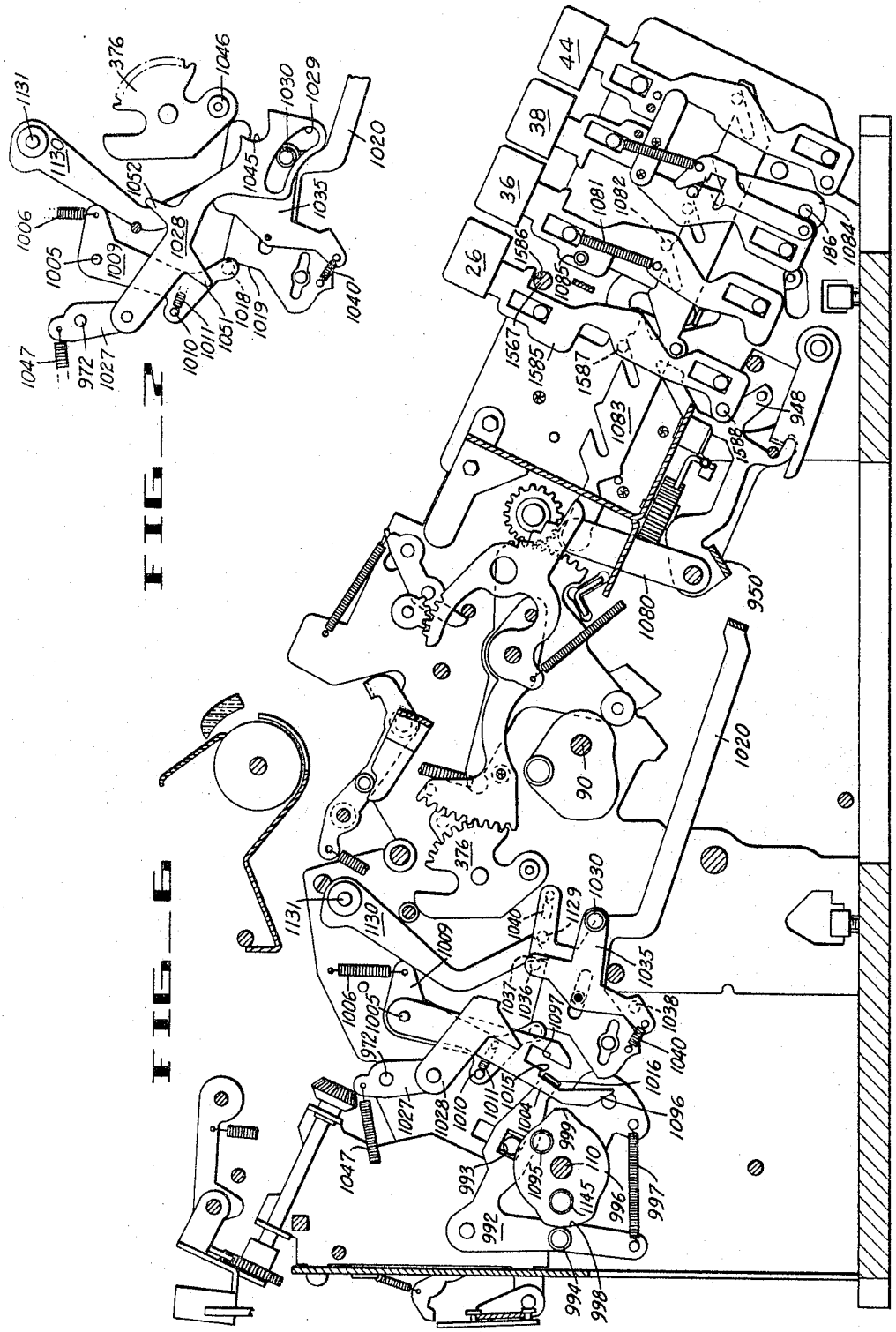

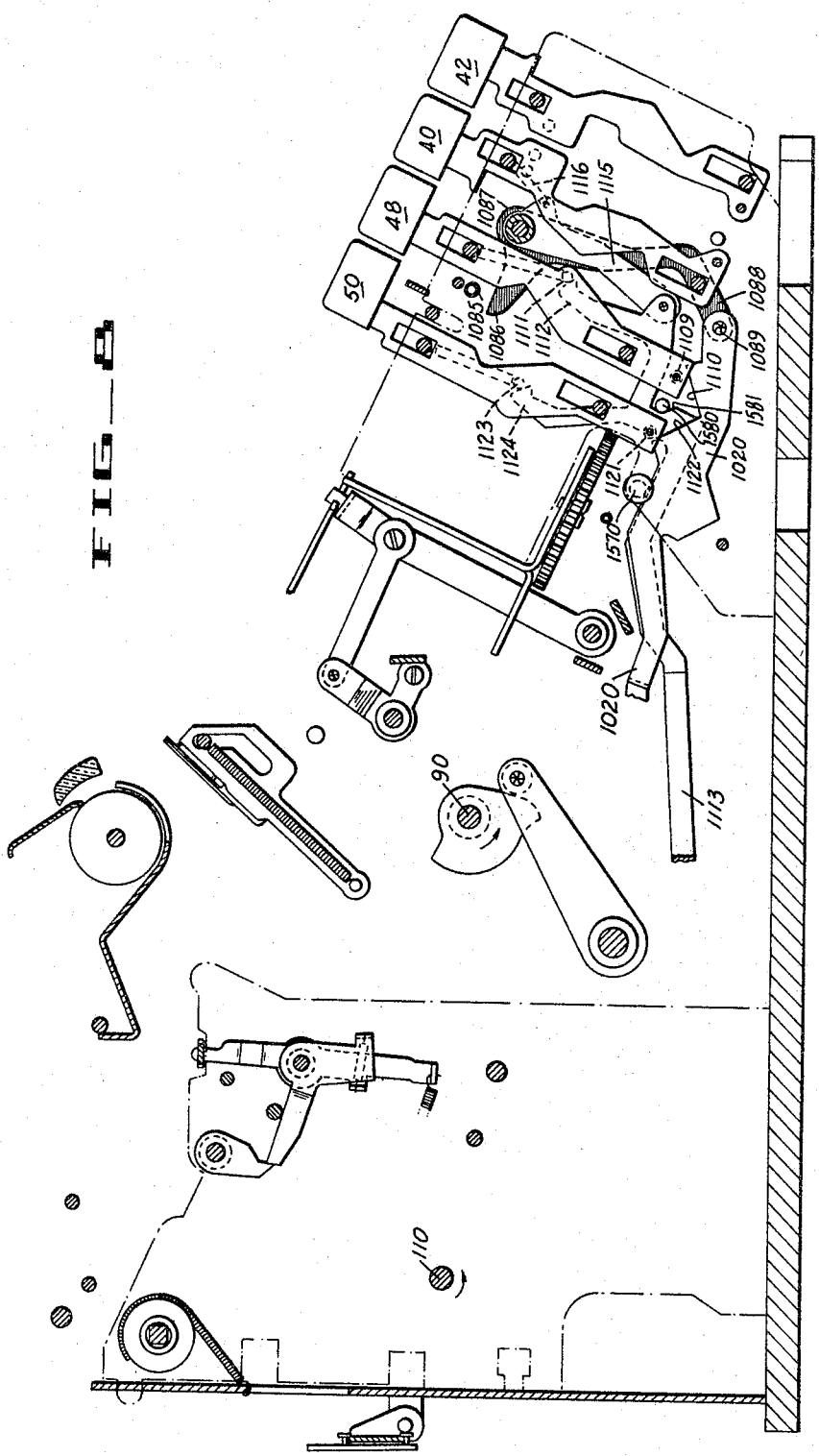

United States Patent Office 3,331,554
Patented July 18, 1967

3,331,554
CALCULATING MACHINE
Harold J. Chall, Castro Valley, and George W. Bowers, Jr., Hayward, Calif., assignors to Friden, Inc., a corporation of Delaware
Original application Nov. 17, 1961, Ser. No. 153,109, now Patent No. 3,212,704, dated Oct. 19, 1965. Divided and this application Dec. 7, 1964, Ser. No. 416,322
4 Claims. (Cl. 235—60)

TABLE OF CONTENTS

| | Column |
|---|---|
| I. General Operation | 2 |
| II. Drive System | 3 |
| III. Selector, Actuator and Accumulator | 3 |
| IV. Multiplier-Storage, or Memory, Unit | 3 |
|     1. Operation of Actuator Pawls 974 | 4 |
|     2. Memory Clearing Bail | 4 |
| V. Control of Memory Entry and Readout Operations | 5 |
|     1. Multiplier-Entry (X) Key | 5 |
|     2. Input Cycle | 6 |
|     3. Memory Input (MI) Key | 7 |
|     4. Memory Output (MO) Key | 7 |
|     5. Readout Cycle | 8 |
| VI. Clear Keyboard and Backspace | 9 |

The present invention relates to automatic printing calculating machines.

This application is a division of the copending application, Ser. No. 153,109, filed Nov. 17, 1961.

The present invention is embodied in the same machine that is disclosed more fully in the Chall and Wiedeman Patent No. 3,108,745, issued Oct. 29, 1963, and in the Chall Patent No. 3,145,923, issued Aug. 25, 1964, the applications of which were copending with said application Ser. No. 153,109, and to which reference is made for supplementing the description herein. For convenience, identical parts are identified by the same reference numerals here, in said copending application, and in those patents. The calculating machine of the present invention constitutes an improvement on the well-known Friden ten-key adding machine, shown, for example, in Chall Patent No. 2,832,530, and includes mechanism for automatically carrying out multiplication and for registering the results thereof in various manners.

It is an object of the present invention to provide an improved control of preparatory, or extra-function, keys by correction keys.

It is a further object of the invention to provide improved interlocks for the memory control of a calculating machine, and to provide an improved control of those memory controls and interlocks by the clear keyboard and backspace controls.

And it is a further object of the present invention to provide an improved high speed printing calculator, and improved controls therefor.

These and other objects and advantages of the present invention will be apparent from the following description of a specific embodiment thereof, and from the claims, taken in connection with the accompanying drawings in which:

FIG. 6 is a left elevational section taken along a plane to the left of that in FIG. 4 and shows some of the multiplier-storage-basket control means.

FIG. 7 is a left elevational partial section, showing the mechanism for operating the clearing bail of the multiplier-storage, or memory, unit.

FIG. 8 is a left elevational section taken along a plane inboard of the left side of the machine for showing particularly parts of the multiplication controls.

I. GENERAL OPERATION

Figure 1:
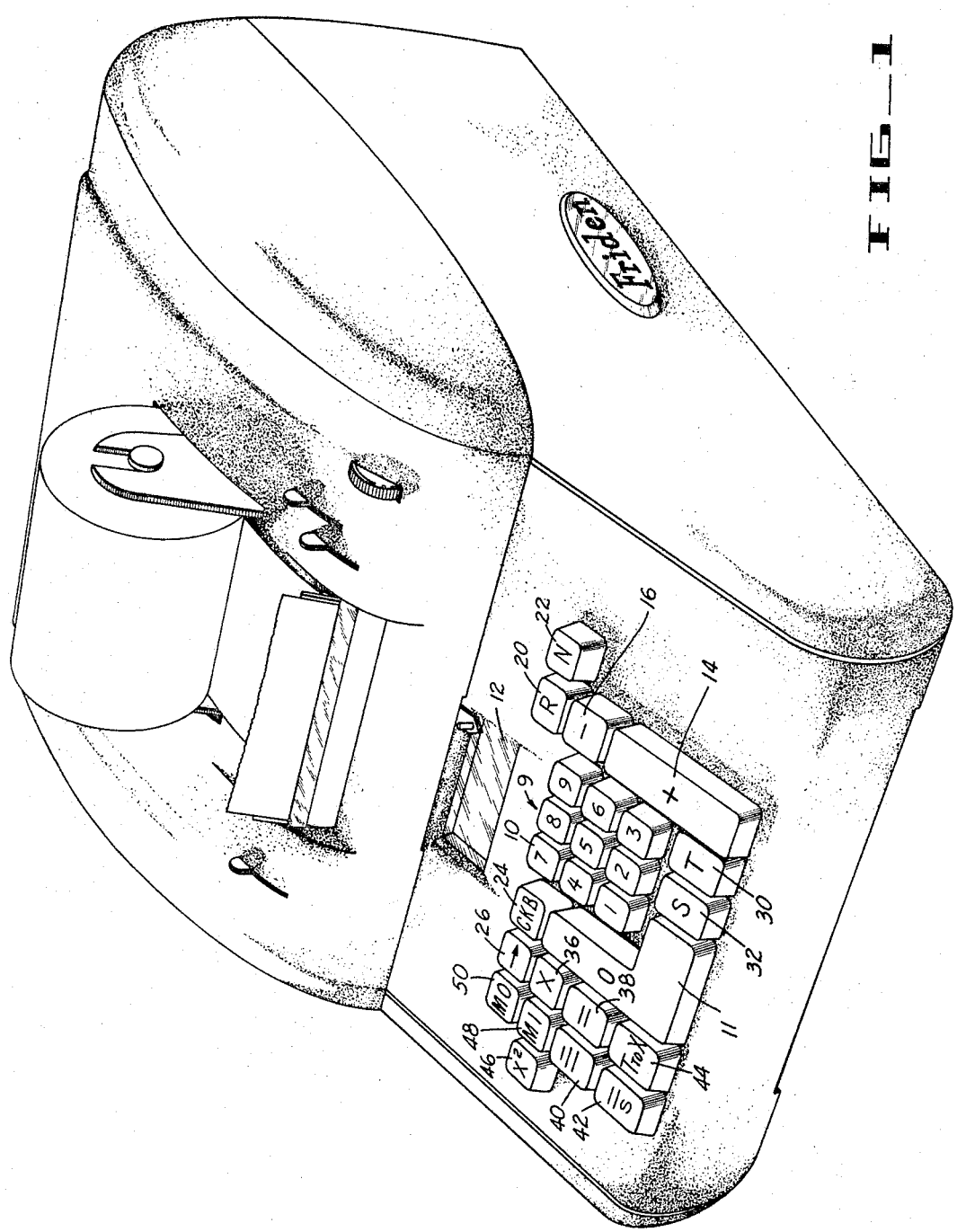
FIG. 1 is an external, perspective view of a machine, complete with case, embodying our present invention, taken from the upper right front.

The calculating machine shown in the drawings is of the ten-key, actuator type, and in its general features is constructed in accordance with U.S. Patent No. 2,832,530, and is similar to the well-known Friden adding machine.

Figure 3:
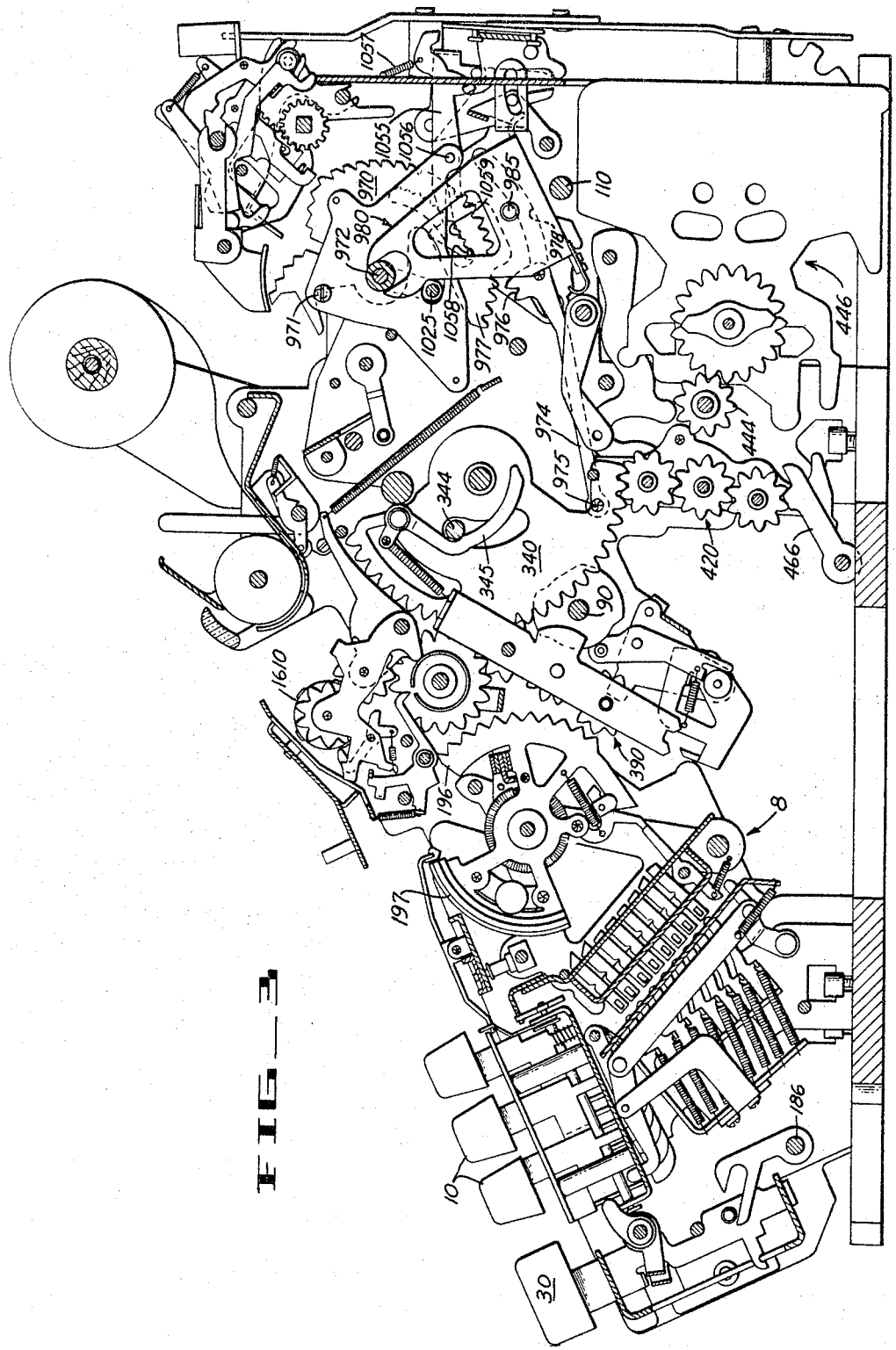
FIG. 3 is a right elevational section taken along a plane just to the right-center of the machine and shows the selection, actuation, accumulation, and memory mechanism.

A number may be entered in a movable selector unit by means of selection keys 9 (FIG. 1), which include the nine numeral keys 10 and the zero (0) key 11, and the number so entered appears in a check window 12 on the check dials 197 of the selector segments 196 (FIG. 3). Depression of an addition key 14 or a subtraction key 16 then initiates an operation that transfers the number to the actuator and also to the accumulator, and prints it, the operation clearing the number from the selector unit. Depression of a repeat (R) key 20 causes a number in the selector to be entered additively in the accumulator without clearing it from the selector. Simultaneous depression of the repeat key 20 and subtract key 16 similarly enters the number subtractively into the accumulator without clearing it from the selector. A print-only (N) key 22 causes the number in the selector to be printed and cleared. A clear keyboard (CKB) key 24 causes the number in the selector to be simply cleared therefrom by returning the selector unit to its home position. A backspace key 26 causes the movable selector carriage to move one space to the right and clear out the digit last entered. A depression of a total (T) key 30 causes the number in the accumulator to be transferred to the actuator and to be printed, leaving the accumulator clear. Depression of a sub-total (S) key 22 similarly transfers the value from the accumulator to the actuator for printing but, in addition, returns it to the accumulator.

With a number in the selector unit, and showing in the check window 12, depression of a multiplier-entry (X) key 36 transfers the number from the selector to the actuator, and also to a multiplier-storage, or memory, unit 970 (FIG. 3) and prints the number, leaving the selector clear. A multiplicand may then be entered in the selector by means of the selection keys 9. Then, depression of a muliplication (=) key 38 causes the multiplicand to be printed once, the multiplication to be performed automatically, the product to be accumulated additively in the accumulator and the number of the accumulator to be printed out in a total operation. Alternatively, the multiplication operation may be initiated by the depression of an accumulative multiplication (= S) key 42, which causes a similar multiplication operation but ends with a subtotal operation, thereby leaving the accumulated product in the accumulator. Depression of a negative multiplication (— =) key 40 causes an operation similar to that of multiplication (=) key 38, but enters the product negatively in the accumulator. A depression of a product transfer (T to X) key 44 produces the same operation as the multiplication key 38, with the addition that the final value in the accumulator is transferred to the multiplier-storage, or memory, unit. Any combination of the keys 38, 40, 42 and 44 may be depressed simultaneously.

With a number in the selector, a squaring entry ($X^2$) key 46 may be depressed to cause the number in the selector to be entered in the multiplier-storage unit and also retained in the selector. Then, any of the keys 38, 40, 42 or 44 may be depressed to cause an automatic multiplication for producing the square of the number.

A memory input (MI) key 48 and a memory output (MO) key 50 are preparatory keys and do not, by themselves, cause an operation of the machine. The memory input key 48 may be depressed previously to, or simultaneously with, keys 14, 16, 20, 22, 30 or 32 to cause the number that is printed to also be entered in the multiplier-storage, or memory, unit. The memory output key 50 may similarly be used with the print-only key 22 for printing out the number standing in the multiplier-storage unit. The memory output key 50 may also be used with either the addition key 14 or subtraction key 16 for printing the number in the multiplier-storage unit and entering it additively or subtractively, respectively, into the accumulator. No memory output operation leaves the multiplier-storage unit clear. The number is transferred from the multiplier-storage, or memory, unit to the actuator for printing, and then is returned to the multiplier-storage unit. Clearing of the storage unit is performed only in preparation for the entry of a new number.

II. DRIVE SYSTEM

Figure 2:
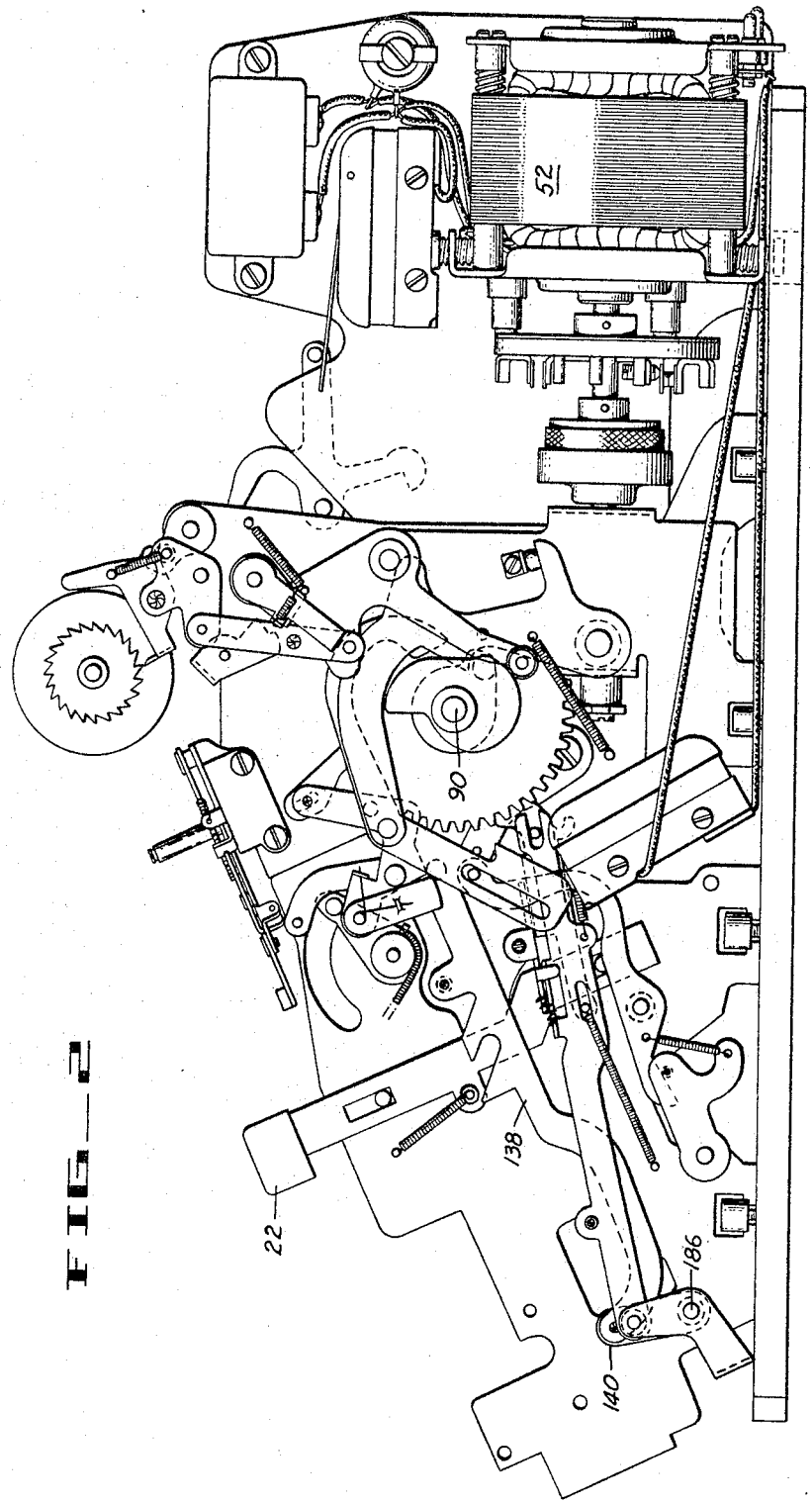
FIG. 2 is a right elevational section taken along a plane just inside the right-hand cover of the machine for showing particularly a part of the drive system and clutch control.

As described in greater detail in the patents previously referred to, and as shown in FIGS. 2 and 3, the machine includes a main drive shaft 90 and a rear drive shaft 110 (FIG. 6) which are geared to rotate in synchronism and at the same speed. A drive mechanism of a well-known construction, including an electric motor 52 (FIG. 2) and a common unidirectional clutch mechanism is provided for driving the shafts (clockwise in these figures) in integral cycles. The machine operates automatically through one cycle for each of the operations of the addition, subtraction, print-only, total, subtotal, clear keyboard, backspace, multiplier entry and squared entry. Multiplication and repeat operations involve two or more integral cycles.

III. SELECTOR, ACTUATOR AND ACCUMULATOR

As shown in FIG. 3, a ten-key selection unit 8 includes sixteen, differentially-settable, ordinal sectors 196 mounted on a transversely movable carriage. The digits of a number are entered in succession, most significant order first, by means of keys 10, and the selector carriage indexes to the left one order for each digit so entered. The carriage also is indexed to the left during multiplication. An actuator includes seventeen ordinally-arranged sectors 340 and is provided with a front gear pendant 390 for engagement with the sectors 196 of the selector unit. A rear gear pendant 420 swings into engagement with drive gears 444 of an accumulator 446. Print wheels 1610, geared to the actuator sectors 340, print numbers while they are in the actuator, at about mid-cycle.

IV. MULTIPLIER-STORAGE, OR MEMORY, UNIT

The multiplier-storage, or memory, unit includes seventeen identical differentially-settable storage sectors 970 (FIGS. 3 and 4) mounted for free rotation on a common shaft 972 supported in the frame of the machine. In FIG. 3, these sectors are shown in their "0" position. Numbers are transferred to these sectors from the actuator sectors 340 by means of actuator pawls 974 pinned at 975 to the actuator sectors. Each pawl has a pair of gear teeth 976 arranged to be lifted into engagement with gear teeth 977 in the lower edge of its storage sector 970.

As shown in FIG. 3, each sector 970 of the memory or multiplier-storage unit is provided with a detent 1055 journalled on a shaft 1056 and rocked by a spring 1057 (counter-clockwise in FIG. 3) for urging the corner of an ear 1058 at its forward end into engagement with the notched edge 1059 of an arcuate slot in the storage sector 970.

1. Operation of actuator pawls 974

During each operating cycle of the machine the pawls 974 are moved by the actuator segments 340, rearward during the first half of the cycle and forward during the second half. The rear ends of the pawls 974 are guided by slots 978 (FIG. 3) in plates carried by a basket structure 980 that is raised and lowered for moving the pawl teeth 976 into and out of engagement with the memory sectors 970.

Figures 4, 5:
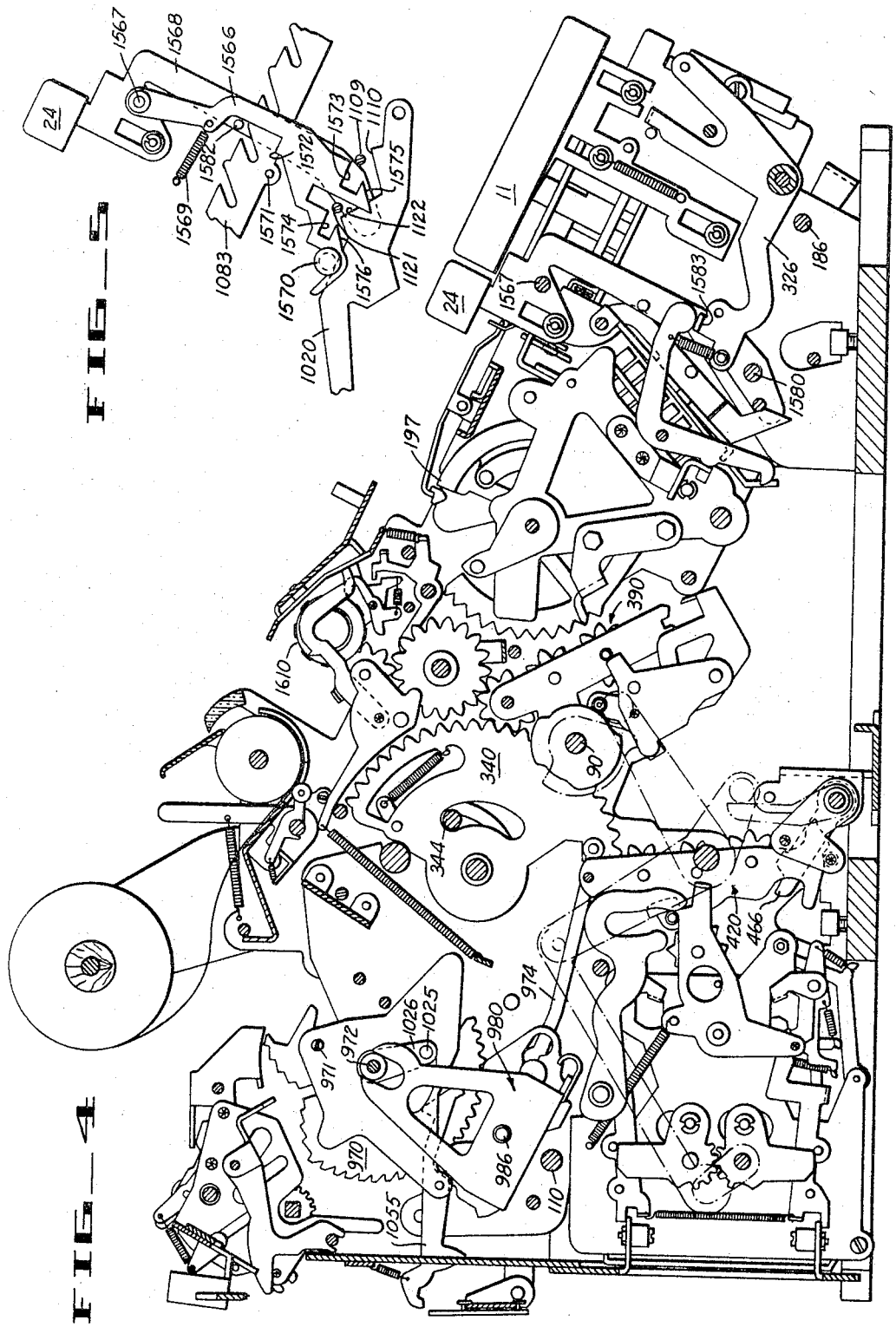
FIG. 4 is a left elevational section taken along a plane just to the left-center of the machine and shows some of the accumulator control, memory clearing, and zero key interlock mechanisms.
FIG. 5 is a left elevational partial section and shows some of the clear keyboard actuating and interlock mechanism.

The motion of the basket is controlled by a pair of similar cam follower arms 992 (FIG. 6) having slots 993 embracing trunnion rollers 985 and 986 (FIGS. 3 and 4). These followers 992 carry rollers 994 (FIG. 6) which ride on similar right and left basket control cams 996 on the rear drive shaft 110. Springs 997 normally urge the follower arms 992 (counter-clockwise in FIG. 6) for lifting the basket 980 and thereby engaging the actuator pawls 974 with the sectors 970. The cams 996 each have two high portions 998 and 999 which drive the basket to its lower position at the full-cycle and mid-cycle positions, respectively.

The follower bellcranks 992 are also controlled by a pair of similar latches 1004 (FIG. 6) which are fixed to the same shaft 1005 extending transversely through the machine so that they operate in unison, and are normally held in the position shown by a spring 1006 which acts on a lever 1009 to urge it counter-clockwise (as viewed in FIG. 6). Lever 1009 carries a pin 1010 (see FIG. 7) which is connected by a light spring 1011 to a pin on latch lever 1004 for normally holding the latch lever against pin 1010 but at times permitting the lever 1009 to be swung rearward without the latch 1004. Normally the spring 1006 urges the pin 1010 forward against the rear edge of latch lever 1004 for holding this latch, and the similar latch 1003 (not shown) forward in the positions shown so that their shoulders 1015 overlie ears 1016 on the bellcranks 992 for latching the basket 980 in its lower position.

Lever 1009 (FIGS. 6 and 7) carries a pin 1018 which normally lies just behind the rear edge 1019 of a memory control link 1020. For setting a memory output operation, the link 1020 is moved rearward, and through pin 1018, disengages the latches 1004 from the bellcranks 992, permitting the basket to rise under control of the cams 996.

Similar latches 1004 also have shoulders 1097 which, when the latches are moved rearward, can underlie the ears 1016 for latching the basket 980 up. Since the cams 996 drive the basket down, these shoulders 1097 cannot be left in latching position when the cam lobes 998 come under rollers 994. Therefore, pins 1095 and 1145 (FIG. 6) are provided on cam 996 (i.e., the left cam of the similar pair) for striking the tail 1096 of the latch lever 1004 for swinging shoulders 1097 clear of the ears 1016 just before the cams pull the basket down.

2. Memory clearing bail

The memory register is provided with a clearing bail 1025 (FIGS. 3 and 4) supported on bail arms 1026 fixed to the shaft 972. This bail normally lies in the position shown in these figures, and is swung rearward (counter-clockwise in FIG. 3) for rotating all of the memory storage sectors 970 to their "0" positions, in which they are shown in FIG. 3 where they stop against a frame tie rod 971. This clearing operation is utilized for clearing one number from the memory before inserting a new one, and it is also utilized as a drive mechanism for ensuring positive operation when a number is read out of the memory unit into the actuator. For operating this clearing bail, the shaft 972 carries a lever arm 1027 (FIGS. 6 and 7) to which is connected a drive link 1028 which, at its forward end, has a curved slot 1029 embracing a roller 1030 carried by a rocking plate 1035.

A pin 1036 at the upper edge of the rocking plate 1035 (FIG. 6) lies just behind a rear facing shoulder 1037 of the memory control link 1020 so that the plate is rocked counter-clockwise in FIG. 6 when the control link 1020 is moved rearward for a memory output operation. A similar pin 1038 at the lower edge of the rock plate 1035 is rocked in the same direction (counter-clockwise in FIG. 6) by forward movement of the link 1020. Such forward movement accompanies operations for entering numbers into the memory unit, that is, operations initiated by the keys 36, 44, 46 and 48 in FIG. 1. Springs 1040 urge the pins 1036 and 1038 against their respective shoulders 1037 and 1039 for centralizing the link 1020 and for holding the rock plate 1035 in its normal position, shown in FIG. 6.

Thus, movement of the memory control link 1020, either forward or rearward out of its normal, centralized position, rocks the plate 1035 (counter-clockwise in FIG. 6). This action lifts the roller 1030 for lifting the drive link 1028 (FIG. 7). In lifted position, a curved shoulder, or seat, 1045 on the link lies behind a roller 1046 of the actuator gear segment 376. The gear segment 376 is rocked (clockwise in FIG. 7) during the first half of each machine cycle and then is returned (counter-clockwise in FIG. 6) to its home position during the second half of the machine cycle. Therefore, when the link 1028 is held in its lifted position by the roller 1030, the roller 1046, during the first half of the machine cycle, drives rearward against the seat 1045 of the link 1028, for rotating the shaft 972, and with it the reset bail 1025 (FIG. 3), for driving the memory segments to their "0" position. As the gear segment 376 rotates to its home position (counter-clockwise in FIG. 7) during the second half of the machine cycle, a spring 1047 returns the clearing bail 1025 to its normal position. The curve of slot 1029 permits link 1028 to follow the arcuate motion of roller 1046.

Drive link 1028 carries a down-extending projection 1051 (FIGS. 6 and 7) which is arranged to move rearward against the pin 1010 (FIG. 7) on the lever 1009 for operating the latch levers 1004 (FIG. 6) during memory entry and readout operations. Another projection 1052 (FIG. 7) on the drive link 1028 controls the printing of symbols, as fully described in the above-mentioned copending application, Ser. No. 153,109.

V. CONTROL OF MEMORY ENTRY AND READOUT OPERATIONS

1. *Multiplier-entry (X) key*

A number may be entered into the multiplier-storage, or memory, unit by an operation initiated by depression of the multiplier-entry (X) key 36 (FIG. 1). As is shown in FIG. 6, this key is held in its upper position by a spring 1081. The stem of this key carries a pin 1082 which lies above an inclined slot in a clutch bar 1083 carried by arms 1080 and 1084, of which arm 1084 is fixed to a shaft 186. As is shown in FIG. 2, shaft 186 at its right end carries an arm 140 connected to the clutch bar 138. Thus when the key 36 (FIG. 6) is depressed, bars 1083 and 138 are moved forward in the machine for releasing the clutch and initiating a machine cycle. The stem of key 36 also carries a pin 1085 which, as shown in FIG. 8, overlies a rearward extending arm 1086 of a bellcrank 1087 having a down-extenidng arm 1088 to which is pinned the memory control link 1020 by means of a pin 1089. Thus depression of the key 36, through bellcrank 1087 (FIG. 8), pulls the memory control link 1020 forward (see also FIG. 6).

It will be recalled that typically a number is first entered into the selector unit by means of the keys 9 (FIG. 1) and then the multiplier-entry (X) key 36 is depressed to cause that number to be transferred through the actuator into the multiplier-storage, or memory, unit.

Operation of the clutch bar 138 (FIG. 2) by the key 36 sets the machine into operation and the single cycle action automatically stops the machine at the end of the first cycle. As described in the above-mentioned copending application, mechanism is provided for controlling operation of the front gear pendant 390, so that, during the first half of this machine cycle, the number in the selector is transferred to the actuator.

2. *Input cycle*

Referring also to FIGS. 6 and 7, the depression of the key 36 moves the memory control link 1020 forward. As previously described, this action causes the pin 1038 to drive the rock plate 1035 (counter-cockwise in these figures) for lifting the notch 1045 (FIG. 7) of the drive link 1028 into alignment with the roller 1046 on the actuator drive gear segment so that during the first half of the machine cycle the link 1028 is driven rearward, so that the clearing bail 1025 (FIGS. 3 and 4) drives all of the memory storage sectors toward their "0" positions. At the same time, the rotation (counter-clockwise in FIG. 6) of the rear drive shaft 110 carries the lobe 998 of cam 996 away from the roller 994, and simultaneously the corresponding lobe of the other similar cam moves away from its roller. Thus, early in the cycle the pair of similar basket bellcranks 992 are released by the cams 996, but they are stopped by the shoulders 1015 of the latch levers 1004.

Late in the first half-cycle, while the drive link 1028 (FIG. 7) is still being driven rearward, the lower projection 1051 on the link 1028 engages pin 1010 (FIG. 6) on the lever 1009 and drives that lever rearward. As the pin 1010 moves rearward, spring 1011 tends to pull the latch levers 1004 rearward with it but the latches are held by the friction and angle of their engagement with the ears 1016 of the bellcranks 992. The force exerted by the springs 997 is so much greater than light spring 1011, and the angle of engagement between the shoulders 1015 of the bellcranks is such that the pressure of these bell cranks, urged by the springs 997, is sufficient to resist the force of the spring 1011 and thereby prevent the latch levers 1004 from following the rearward motion of the lever 1009.

Also during the first half of the machine cycle, the actuator pawls 974 are moved rearward (to the right as seen in FIG. 3), but because the bellcranks 992 have not been permitted to follow the cams 996, the basket 980 has remained in its lower position and the pawls 976 have not engaged the sectors 970. It will be recalled that each sector 340 of the actuator rotates to an angular position that depends on the digit that it receives from the selector unit, and accordingly each sector 340 moves the pawl 974 that is connected to it, rearward, a distance also corresponding to that digit.

At mid-cycle, when the pawls 974 have all completed their rearward motion, the smaller lobes 999 of cams 996 (FIG. 6) come under rollers 994 of the basket bellcranks 992. This action lowers the ears 1016 of these bellcranks, and releases their pressure on the shoulders 1015 of the latch levers 1004 for releasing those levers to the action of the spring 1011, which is still extended because the drive link 1028 is, at this time, at its extreme rearward position. Thus, at mid-cycle, the basket control bellcranks 992 are released to the control of their cams 996. As the machine enters the second half of the cycle, rollers 994 run off the lobes of the cams, the bellcranks 992 rock (counter-clockwise as seen in FIG. 6) and permit the springs 997 to lift the basket 980 so that the pawls 974 (FIG. 3) are lifted into a position for engaging the sectors 970. Thereafter, as the machine continues in the second half-cycle, the actuator bail rod 344 (FIG. 3) is swung up to its home position for driving all of the actuator sectors 340 home. This action moves the pawls 974 forward (left in FIG. 3) for transferring the values from the actuator sectors to the multiplier-storage sectors 970. At the completion of this forward motion the gear portions 976 of the pawls 974 are in their extreme forward positions but are still in engagement with sectors 970.

As the machine approaches the end of the cycle, the lobes 998 of the cams 996 (FIG. 6) again come under the rollers 994 for again lowering the basket. At the same time, the roller 1095 on the left-hand cam 996 (FIG. 6) drives agains the lower end 1096 of the left-hand latch lever 1004 for ensuring that this lever is swung forward so that the shoulder 1097 on this hook lever is moved forward and clear of the ear 1016 on the bellcrank 992, and for clearing a similar shoulder on the right side of the machine. Accordingly, at the end of the machine cycle, the number has been transferred from the selector to the memory, or multiplier-storage, unit and the selector has been cleared.

3. *Memory input (MI) key*

The memory input key 48 (FIG. 1) is an extra-function, preparatory key, and does not operate the clutch for initiating a machine cycle. The stem of key 48 carries a pin 1109 (FIG. 8) which overlies a cam edge 1110 on the link 1020 so that depression of the key 48 moves the link 1020 forward for setting up the controls for the entry of a number into the memory unit. The stem of key 48 also carries a pin 1111 which cooperates with a hook 1112 which is part of a link 1113 that is drawn rearward near the end of each machine cycle. The forward end of link 1113 is supported on a link 1115 to which a spring 1116 is connected for biasing the link 1113 forward (FIG. 8). Thus, upon depression of "MI" key 48, the pin 1111 rocks the hook 1112, passes below it, and is latched in its depressed position. With the key 48 thus latched down, the machine may be put into operation, as, for example, by any of the keys 14, 16, 20, 22, 30 or 32 on the right-hand side of the machine, and the number brought into the actuator by the operation thereby initiated will also be entered into the memory unit. Near the end of the machine cycle the link 1113 moves rearward for disengaging the hook 1112 (FIG. 8) from the pin 1111 and thereby releasing the key 48 to be restored by its spring 1108. Although during a repeat operation, the hook 1112 is disengaged from the pin 1111 by operation of the selection unit restore mechanism during each machine cycle, the memory input key 48 will be held down by a link 1566 (FIG. 5), as will be described.

4. *Memory output (MO) key*

The memory output (MO) key 50 (FIG. 1) is also an extra-function, preparatory key and does not control the clutch for initiating a machine cycle. It carries a pin 1121 (FIG. 8) at its lower end overlying a cam surface 1122 on the memory control link 1020 so that when key 50 is depressed, the link 1020 is moved rearward. The stem of key 50 also carries a pin 1123 which cooperates with a hook 1124 on the link 1113 for latching the key 50 down and releasing it at the end of the machine cycle in the same manner as the key 48 is latched and released.

Slide 1020 carries a pin 1129 (FIG. 6) lying in front of the lower end of a lever 1130 fixed to a shaft 1131. Shaft 1131 extends through to the right side of the machine for disrupting operation of the front gear pendant 390 (FIG. 3) upon rearward movement of the link 1020. Furthermore, operation of shaft 1131 is effective to prevent operation of the main total and subtotal shaft 560. The affect of these actions is to ensure that during the memory output operation the actuator 340 can receive a number only from the memory unit.

Accordingly, after the memory output key 50 is depressed, the machine cycle may be initiated by any of the keys on the right-hand side of the machine, that is, keys 14, 16, 20, 22, 30 or 32. The print-only key 22, the total key 30 or the subtotal key 32 will cause the machine to read out and print the number in the memory unit and then, as will be described, return it to the memory unit. It is because the total-subtotal mechanism is blocked by lever 1139 that the total and subtotal keys in this instance produce the same operation as the print-only key. The add key 14 or subtract key 16 will produce the same operation and, in addition, will enter the number into the accumulator, additively or subtractively, respectively. Depression of the repeat key will enter the number from the memory unit into the accumulator repeatedly. During this repeat-add, memory-output operation, the "MO" key 50 is held down by a cam edge 1576 (FIG. 5) overlying the pin 1121 on the key stem of the "MO" key 50 (FIG. 8), as will be explained under "Clear keyboard and backspace." The foregoing memory output operations utilizing the print-only, total, subtotal, add and subtract keys, all clear the selector; the operation with the repeat key does not.

Interlocks (not shown) are provided to prevent simultaneous use of the memory output key 50 and any of the multiplier-entry and multiplication keys 36, 38, 40, 42, 44 or 46. Interlocks may also be provided between the "MO" key 50 and each of the total and subtotal keys 30 and 32 if desired. As will be described, depression of either the backspace key 26 or the clear keyboard key 24 releases the memory input and memory output keys 48 and 50.

5. *Readout cycle*

Referring back to the rearward movement of the memory control link 1020 (FIG. 6) when the "MO" key 50 is depressed, this action also drives against pin 1036 for rocking the plate 1035 (counter-clockwise in this figure) for lifting roller 1030 and thereby lifting the seat 1045 (FIG. 7) into position behind the roller 1046 on the actuator gear segment 376. The rear edge 1019 of the link 1020 also drives against pin 1018, for rocking the lever 1009 and thereby, through spring 1011, pulling the left-hand latch lever 1004 rearward, and with it the similar right-hand latch lever (not shown) on the other side of the machine, for unlatching the basket control bellcranks 992. At this time, the latches 1004 are not restrained by the bellcranks 992. Then when an operating key is depressed, such as the print-only key 22 (FIG. 1), the machine begins an operating cycle. The cams 996 (FIG. 6) quickly run out from under the rollers 994 to permit the springs 997 to lift the basket 980 for raising the pawls 976 (FIG. 3) into engagement with the memory sectors 970, and spring 1011 pulls the latch levers 1004 rearward to latch ears 1016 in their upper position. Promptly thereafter, the actuator gear segment 376 (FIG. 7) begins rotating (clockwise in this figure) for swinging the actuator bail 344 (FIG. 3) down and driving the actuator segments. At the same time roller 1046 (FIG. 7) drives rearward against the drive link 1028 for driving the clearing bail 1025 (FIG. 3) of the memory unit rearward. It is to be noted that the drive exerted by the actuator bail 344 (FIG. 3) is a yielding drive in that it drives through the spring-loaded, sickle-shaped levers 345, whereas, the clearing bail 1025 of the memory unit positively drives all the memory sectors 970 to "0" and so ensures that the number is properly transferred to the actuator unit.

At mid-cycle the cam lobes 999 must pass rollers 994 and, therefore, the hooks 1097 must release ears 1016 of bellcranks 992 (FIG. 6). As link 1028 approaches its rear position, projection 1051 (FIG. 7) comes against pin 1010, but lever 1009 is already held in its extreme rear position by link 1020 against pin 1018. Accordingly, as the machine approaches mid-cycle, the roller 1145 on the cam 996 (FIG. 6) strikes the tail 1096 of the lever 1004 for disengaging the latch shoulder 1097 from the ear 1016 of the bellcrank 992, and similarly disengages the right-hand latch lever from its bellcrank. Then as the lobes 999 pass the rollers 994, the basket is lowered for disengaging the pawls 974 (FIG. 3) from the storage sectors 970, and immediately raised for re-engaging them. During this temporary disengagement, the memory sectors 970 are held in their "0" positions by the clearing bail 1025, and the actuator sectors 340 are held by detents 466 (FIG. 3). At this mid-cycle, the number thus brought into the accumulator from the memory storage unit is printed in a well-known manner. As the machine goes into the second half of the cycle, the basket 980 is in its upper position so that the gear teeth 976 are in engagement with the memory sectors 970 for connecting them to the actuator. During this second half-cycle, the actuator bail 344 moves up to its home position and positively drives all of the actuator sectors to their "0" positions, and in so doing, transfers the number back to the sectors 970 of the memory unit. As the machine approaches its full-cycle position, the pin 1095 (FIG. 6) on cam 996 strikes the tail 1096 of the latch lever 1004 for unhooking the basket bellcranks 992, as previously described. The basket is then lowered by the cams 996 as they come to their home position. Also near the end of the cycle the link 1113 is moved rearward, as previously described in connection with the operation of the memory input key 48. This rearward motion of link 1113 disengages hook 1124 (FIG. 8) from the pin 1123, permitting the memory output key 50 to rise to its normal position. The machine will stop under control of the operating key that initiated the operation.

VI. CLEAR KEYBOARD AND BACKSPACE

The clear keyboard operation initiated by key 24 cycles the machine for clearing the selector. It is essentially a print-only operation with printing suppressed by means shown and described in the copending application and patents previously referred to.

Special interlocks are provided to prevent a clear keyboard or a backspace operation from being attempted at the same time as a memory input or memory output operation. In FIG. 5 an interlock lever 1566 is journalled at 1567 on the stem 1568 of the clear keyboard key 24 (see also FIG. 1) and is biased rearward by a spring 1569 against a shouldered stop-and-guide pin 1570. A pin 1571 on the clutch control bar 1083 is aligned with a shoulder 1572 on the lever 1566 for driving the lever forward (counter-clockwise in FIG. 5) when the clutch is operated for cyling the machine. However, if the clear keyboard key 24 is depressed, the shoulder 1572 is lowered and left clear of the pin 1571. The lower end of lever 1566 is provided with slots 1573 and 1574 cooperating with the pins 1109 and 1121 on the memory input and memory output keys, respectively. With the clear keyboard key 24 in its upper position, and the lever 1566 swung forward by pin 1571, the pins 1109 and 1121 on the memory input and memory output keys are embraced by the slots 1573 and 1574, or one or the other is forced to its fully depressed position by a cam face 1575 or 1576. (The two pins 1109 and 1121 cannot be depressed simultaneously because they act in opposite directions on the cam faces 1110 and 1112 of the memory control link 1020, FIG. 5 and 8). Thus, for example, if the memory input key 48 is only partially depressed at the same time as an operating key, such as the addition key 14, is depressed, the movement of the clutch bar 1083, through pin 1571 and lever 1566, will force the memory input key to its fully depressed position for proper operation. When the clear keyboard key 24 is depressed, the lever 1566 moves down with it, staying clear of the pins 1109 and 1121. The clear keyboard key stem 1568 also carries a pin 1580 (FIG. 4) which, as shown in FIG. 8, overlies a cam edge 1581 of the link 1113 which carries the two hooks 1112 and 1124 that latch down the keys 48 and 50. Consequently, the depression of the clear keyboard key 24 releases the memory input and memory output keys to prevent any inadvertent memory transfer operation at the same time. The clear keyboard key stem 1568 also carries a pin 1582 which cooperates with the clutch bar 1083 (FIG. 5) so that the key 24 from being depressed simulteaneously with any the key 24 down.

An interlock is provided to prevent the clear keyboard key 24 from being depressed simultaneously with any of the right side control keys 14, 16, 20, 22, 30 or 32, or with any of the multiplication keys 36, 38, 40, 42, 44 or 48. This interlock is of a known type and includes a bar, not shown, but similar to, and lying parallel to the clutch bar 1083 (FIG. 5) which is similarly moved by the pin 1582 on the key stem 1568 when the clear keyboard key is depressed. This same interlock bar is blocked by an ear 1583 (FIG. 4) on a bell-crank 326 whenever the selector unit is in home position, as is explained more fully in the patents previously referred to.

The backspace key 26 has a key stem 1585 (FIG. 6) with a shoulder 1586 that overlies the pin 1567 of the clear keyboard key (FIG. 5) so that depression of the backspace key depresses also the clear keyboard key. The backspacing key stem 1585 also has a pin 1587 (FIG. 6) that cooperates with an inclined slot in the clutch bar 1083 so that the clutch bar locks the backspacing key 26 down. Another pin 1588 (FIG. 6) on the backspacing key stem 1585 overlies an arm 948 of a bail 950, which is rocked (clockwise in FIG. 6) for setting the machine for the backspacing action, as described in the patents previously referred to. Thus, depression of backspace key 26 also releases the preparatory "MI" and "MO" keys 48 and 50 for preventing the entry or printing of a number being corrected.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination in a calculating machine, means for operating the machine in cycles, function keys operable for conditioning the machine and initiating cycle operation thereof, an extra-function key which conditions the machine but does not initiate cyclic operation thereof, a power operated lever operable for driving said extra-function key from a partially-operated position to its fully operated position during the early portion of a cyclic operation of the machine, and a corrective function key for altering the key-set condition of said machine, said corrective function key setting said lever to inoperative condition and initiating a cyclic operation of the machine.

2. The combination of claim 1 wherein there is included a latch means for holding said extra-function key depressed, and wherein said corrective function key releases said latch.

3. In combination in a calculating machine:
   (a) means for operating the machine in cycles;
   (b) settable number-entry keys;
   (c) function keys operable for conditioning the machine for an operation on numbers and for initiating cyclic operation of said machine;
   (d) an extra-function key which is operable for conditioning the machine for an operation on numbers upon a cyclic operation, but which does not initiate such cyclic operation; and
   (e) a corrective function key for altering the key-set condition of said machine, said corrective function key being operable for restoring said extra-function key to inoperative condition and then initiating a cyclic operation of the machine.

4. In combination in a calculating machine:
   (a) an accumulator;

(b) a memory register;
(c) a key settable selector for the entry of numbers;
(d) means for operating the machine in cycles;
(c) a key settable selector for the entry of number;
(e) function keys operable for conditioning the machine for entries into said accumulator from said selector and readouts from said accumulator and for initiating cyclic operation of said machine;
(f) a memory-input key for conditioning the machine for an entry into said memory;
(g) a memory output for conditioning the machine to readout entries previously entered into said memory register; and
(h) a selector-correction key for altering the key-set condition of said selector and operable for restoring said memory-input key and said memory output key to inoperable position and then initiating a cyclic operation of said machine.

References Cited

UNITED STATES PATENTS

| | | | |
|---|---|---|---|
| 2,075,375 | 3/1937 | Turck | 235—130 |
| 2,389,062 | 11/1945 | Lambert | 235—130 |
| 2,570,068 | 10/1951 | Niemann | 235—130 |
| 2,644,637 | 7/1953 | Butler | 235—60.49 |

STEPHEN J. TOMSKY, *Primary Examiner.*

UNITED STATES PATENT OFFICE
CERTIFICATE OF CORRECTION

Patent No. 3,331,554  
July 18, 1967

Harold J. Chall et al.

It is hereby certified that error appears in the above numbered patent requiring correction and that the said Letters Patent should read as corrected below.

Column 2, line 49, for "22" read -- 32 --; column 5, line 68, for "extenidng" read -- extending --; column 7, line 10, for "agains" read -- against --; column 8, line 15, for "Clear keyboard and backspace" read -- CLEAR KEYBOARD AND BACKSPACE --; column 10, line 3, strike out "from being depressed simuleaneously with any" and insert instead -- actuates the clutch bar and the clutch bar locks --; line 13, for "broad" read -- board --; line 14, for "bell-crank" read -- bellcrank --; line 44, for "cycle" read -- cyclic --; column 11, line 4, strike out "(c) a key settable selector for the entry of number;".

Signed and sealed this 8th day of October 1968.

(SEAL)  
Attest:

EDWARD M. FLETCHER, JR.  
Attesting Officer

EDWARD J. BRENNER  
Commissioner of Patents